United States Patent [19]
Smith et al.

[11] Patent Number: 6,082,749
[45] Date of Patent: Jul. 4, 2000

[54] ALIGNMENT PIN AND SLOT STRUCTURE FOR A SPRING AND STRUT MODULE OF AN AUTOMOTIVE VEHICLE

[75] Inventors: Mark C. Smith, Troy; Slawomir J. Herman, Rochester, both of Mich.

[73] Assignee: Chrysler Corporation, Auburn Hills, Mich.

[21] Appl. No.: 09/158,998

[22] Filed: Sep. 23, 1998

[51] Int. Cl.[7] .............................. B60G 3/00; B60G 15/07
[52] U.S. Cl. ........................... 280/124.155; 280/124.147; 188/321.11; 267/221
[58] Field of Search ..................... 280/124.155, 124.147; 267/219, 220, 221; 188/321.11

[56] References Cited

U.S. PATENT DOCUMENTS

| | | | |
|---|---|---|---|
| 4,372,575 | 2/1983 | Hyma | 280/661 |
| 5,382,044 | 1/1995 | Smith et al. | 280/673 |
| 5,454,585 | 10/1995 | Dronen et al. | 280/660 |
| 5,788,262 | 8/1998 | Dazy et al. | 280/668 |

*Primary Examiner*—Peter C. English
*Assistant Examiner*—Lynda Jasmin
*Attorney, Agent, or Firm*—Lawrence J. Shurupoff

[57] ABSTRACT

Pin and slot structure for rotationally positioning a bearing and spring seat assembly relative to a strut mount of a spring and strut module. The bearing and spring seat assembly includes a spring seat having a slot. The strut mount includes a strut mount plate having a slot registering with the slot in the spring seat. The pin has opposite side walls which taper longitudinally toward one another. The slot in the spring seat has side walls which have a taper corresponding to the taper of the side walls of the pin. The pin is insertable into the slots with the tapered side walls of the pin in wedging engagement with the tapered side walls of the slot in the spring seat. One of the side walls of the slot in the spring seat is axially serrated to provide ridges which grip the pin when the pin is inserted. The pin has end walls provided with integral shear strips engageable with the end walls of the slot in the strut mount when the pin is inserted.

11 Claims, 4 Drawing Sheets

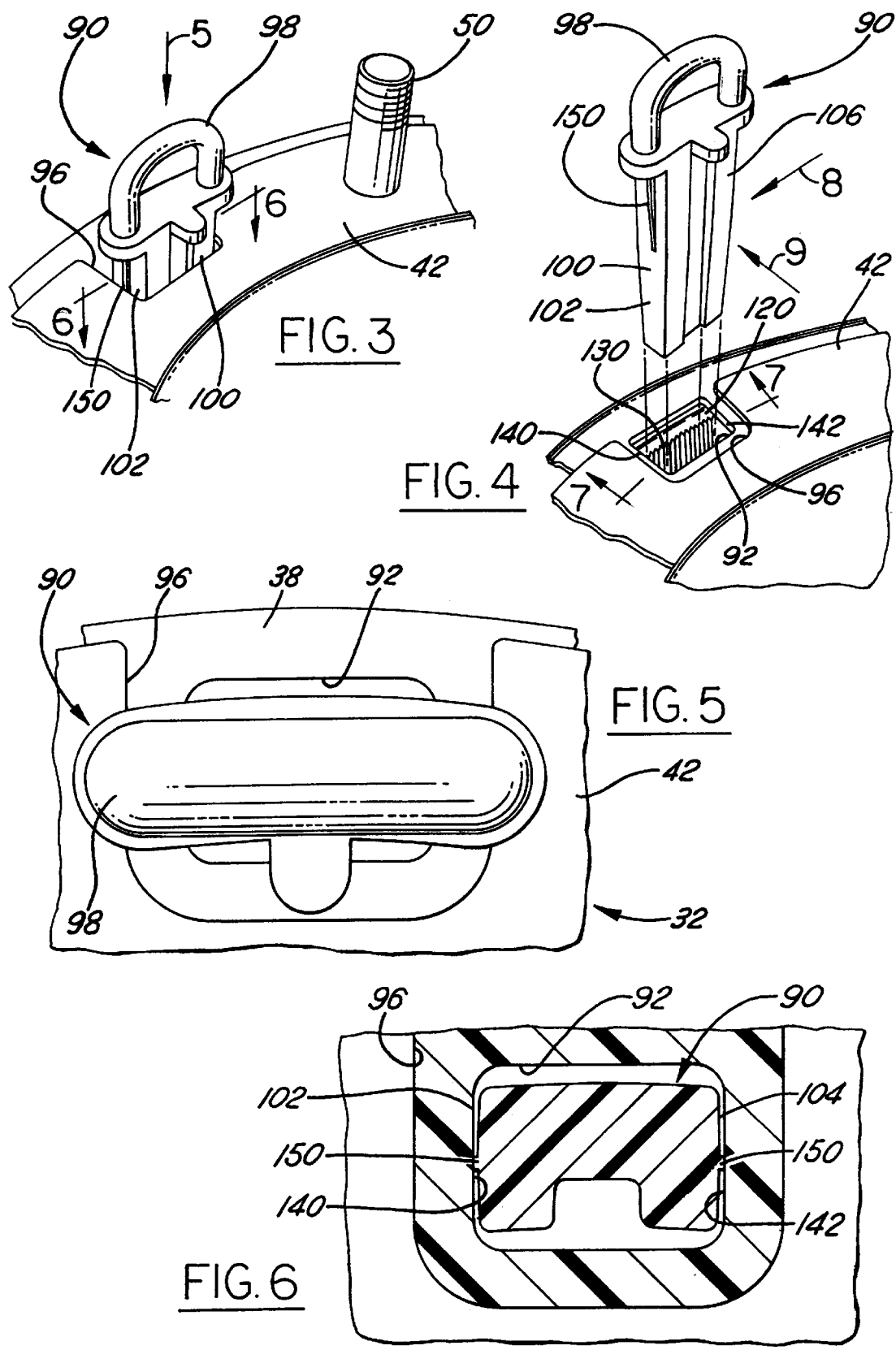

ALIGNMENT PIN AND SLOT STRUCTURE FOR A SPRING AND STRUT MODULE OF AN AUTOMOTIVE VEHICLE

This invention relates to an alignment pin and slot structure for rotationally positioning a strut mount relative to a bearing and spring seat assembly of a spring and strut module of an automotive vehicle.

BACKGROUND AND SUMMARY OF THE INVENTION

A spring and strut module typically has a strut and a spring unit between the brake and knuckle module of a wheel assembly and the frame of the vehicle. The spring unit has a bearing and spring seat assembly and the strut has a strut mount which is bolted to the frame of the vehicle. However, until just prior to the actual bolting of the strut mount to the frame, it is desirable to rotationally position the strut mount relative to the bearing and spring seat assembly. In the past, an alignment pin has been provided for this purpose which was a simple round pin extended into a round hole. This secured the alignment, but did not allow the needed plus or minus 5° of rotational adjustment between the strut mount and bearing and seat assembly. What has been needed is an alignment pin and slot arrangement which would secure the rotational alignment but still allow the necessary freedom of rotational adjustment.

In accordance with the present invention, an alignment pin and slot structure for rotationally positioning the strut mount relative to the bearing and spring seat assembly includes an alignment pin adapted to extend through aligned slots in the upper spring seat of the bearing and spring seat assembly and in the strut mount. The pin has tapered sidewalls. One of the slots has opposed, confronting sidewalls which have the same taper as the sidewalls of the pin. The pin has a wedging engagement in the tapered slot.

Preferably, one of the slots is wider than the pin so that some degree of rotational adjustment is permitted. The wider slot may be serrated to provide ridges which will bite into the material of the pin to lock the components in adjusted position. The other slot may correspond in width to the pin and the pin may have shear strips engageable with the walls thereof.

One object of this invention is to provide an alignment pin and slot structure having the foregoing features and capabilities.

Another object is to provide an alignment pin and slot structure which is of simple construction, inexpensive to manufacture and easy to use.

These and other objects, features and advantages of the invention will become more apparent as the following description proceeds, especially considered with the accompanying drawings.

BRIEF DESCRIPTION OF THE DRAWINGS

FIG. 3 is a fragmentary perspective view showing the alignment pin extended into a slot in the strut mount;

FIG. 4 is a view similar to FIG. 3 but showing the alignment pin withdrawn;

FIG. 5 is a view looking in the direction of the arrow 5 in FIG. 3;

FIG. 6 is a sectional view taken on the line 6—6 in FIG. 3;

DETAILED DESCRIPTION OF THE PREFERRED EMBODIMENT

Figure 1:
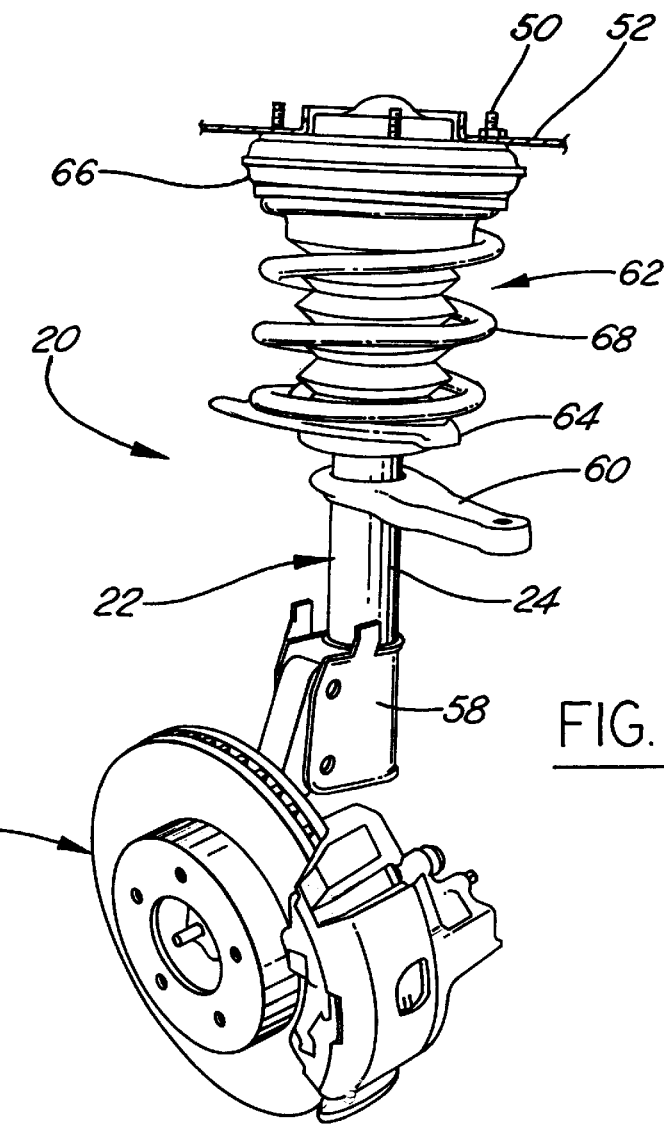
FIG. 1 is a perspective view of a spring and strut module and also showing a brake and knuckle module connected thereto.
Figure 1A:
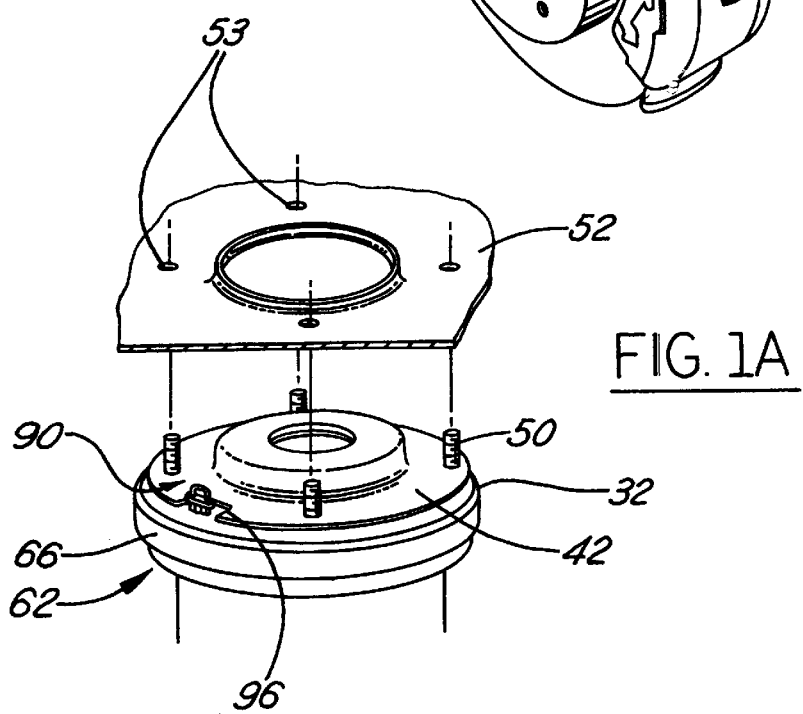
FIG. 1A is a fragmentary perspective view of a strut mount at the upper end of the strut module shown prior to attachment to the vehicle frame, with an alignment pin of this invention extended through a slot in the strut mount and into the upper spring seat of the bearing and spring assembly.
Figure 2:
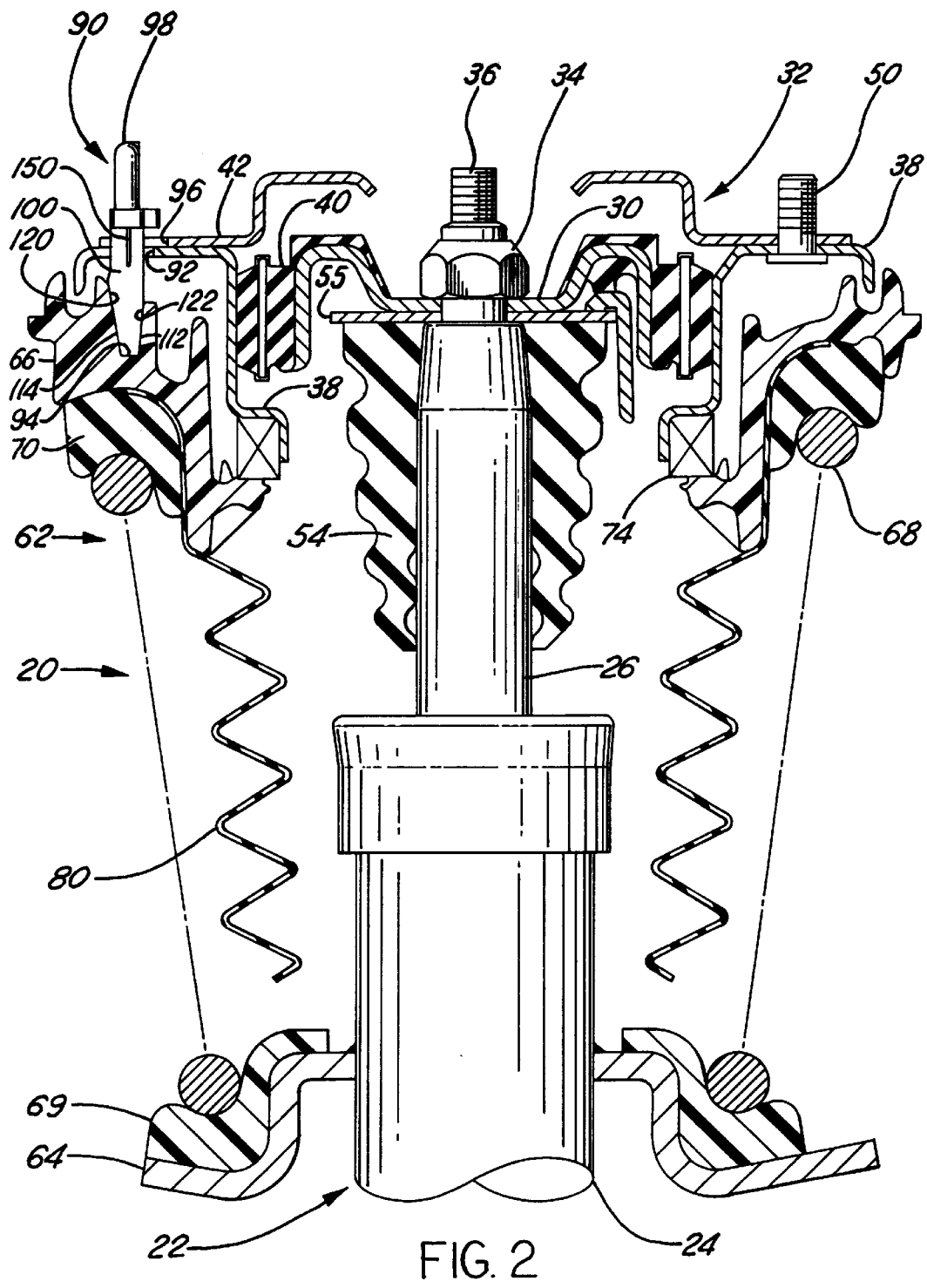
FIG. 2 is an enlarged fragmentary sectional view of the upper portion of the spring and strut module, showing the alignment pin of this invention extended through aligned slots in the strut mount and in the upper spring seat of the bearing and spring seat assembly.

Referring now more particularly to the drawings, there is shown a spring and strut module 20 including a strut in the form of a shock absorber 22 which has a piston (not shown), reciprocable in a cylinder 24. The piston has a rod 26 (FIG. 2) which extends from the cylinder and is secured to a center plate 30 of a strut mount 32 by a nut 34 threaded on a bolt 36 extending from the rod. The center plate 30 is secured to an outer ring plate 38 of the strut mount 32 by a resilient ring 40. The outer ring plate 38 is secured to an annular cover plate 42 of the strut mount. The cover plate 42 has a circular series of bolts 50 (FIG. 1A) for securing the strut mount 32 to a fixed frame member 52 of rigid vehicle support structure. The frame member 52 has a circular series of bolt holes 53 adapted to receive the bolts 50. A tubular resilient jounce bumper 54 of rubber or the like encircles the rod 26 with its upper end having a ring 55 bearing against the center plate 30 of the strut mount. The lower end of the jounce bumper is engaged by the upper end of the cylinder 24 when the piston of the shock absorber strokes, to impart a cushioning action.

A brake and knuckle module 56 is secured to the lower end of the cylinder 24 of the shock absorber 22 by a bracket 58. A steering arm 60 has one end secured to the cylinder 24.

The spring and strut module 20 includes a bearing and spring seat assembly 62 having an annular lower spring seat 64 which is secured to the cylinder 24 intermediate its ends as by welding, and an annular upper spring seat 66. A coil spring 69 encircles the shock absorber. The lower end of spring 68 is seated on an isolator 68 carried by the lower spring seat 64 and its upper end is seated on an isolator 70 carried by the upper spring seat 66.

An annular ball bearing unit 74 rotatably supports the outer ring plate 38 of the strut mount 32 on the upper spring seat 66. A tubular dust shield 80 surrounds the shock absorber 22 with its ends gripped between the upper and lower spring seats and the associated isolators.

Prior to the actual bolting of the strut mount 32 to the fixed frame member 52 of the vehicle support structure, it is desirable to have the strut mount 32 pinned to the upper spring seat 66 of the bearing and spring assembly in a proper rotational position in order to align the bolts 50 on the strut mount with the bolt holes 53 in the fixed frame. For this purpose, an elongated alignment pin 90 is provided, adapted to be pressed through a slot 92 in the outer ring plate 38 of the strut mount 32 and a registering slot 94 in the upper spring seat 66 of the bearing and spring seat assembly 22. The cover plate 42 has notches 96 clearing the slots 92.

Figure 9:
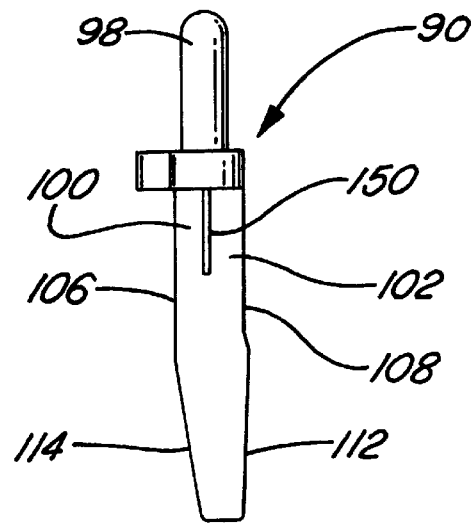
FIG. 9 is a detail view of the alignment pin looking in the direction of the arrow 9 in FIG. 4.

The pin 90 is preferably made of a suitable plastic such as polyethylene or glass-fiber filled nylon. The pin has a handle 98 at one end. An elongated shank 100 extends from the handle. The shank 100 is formed with spaced apart parallel end walls 102 and 104 (FIG. 6) defining a pin width, and spaced apart sides 106 and 108 (FIG. 9). The sides 106 and 108 are parallel adjacent to the handle 98, but then taper toward one another to the outer end of the shank. The taper is provided by side walls 112 and 114. The side wall 112 has a taper of 2° from the longitudinal center line of the shank. The side wall 114 has a taper of 8°. Together, the included angle between the side walls 112 and 114 is 10° and may be as much as 14°. The taper provides a wedge lock as more fully described hereinafter when the pin is inserted into the slot 94 in the upper spring seat 66.

The slot 94 in the upper spring seat 66 is circumferentially elongated with a slot width greater than the width of pin 90 and greater than the width of slot 92 and is open at the top, but closed at the bottom. The radially outer side wall 120 of the slot 94 extends axially and circumferentially with respect to the center line of the spring seat 66 and shock absorber 22, but with a taper which inclines radially inwardly from top to bottom at an angle corresponding to the angle of taper of the side wall 114 of the pin, in this instance 2°. The radially inner side wall 122 of the slot 94 confronts the side wall 120 and is inclined relative to the same center line at an angle of 8° in a radially outward direction from top to bottom corresponding to the taper of the side wall 112 of the pin. Thus the taper of the side walls 112 and 114 at the outer end portion of the pin corresponds to the taper of the slot 94 so that when the pin is inserted in the slot as in FIG. 2, the side walls 112 and 114 of the pin will have a tight and flush surface-to-surface wedging engagement with the side walls 122 and 120 of the slot.

Figure 7:
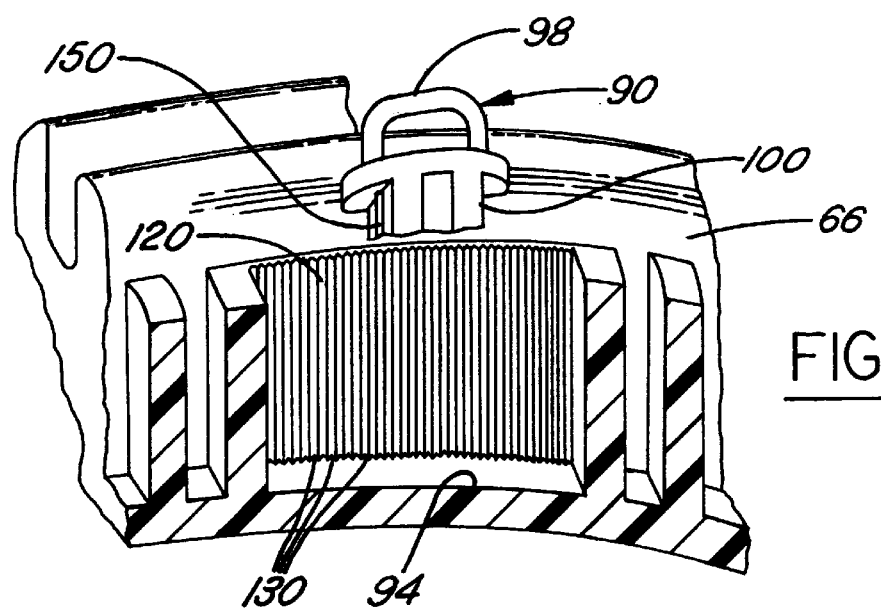
FIG. 7 is a sectional view taken on the line 7—7 in FIG. 4.
Figure 8:
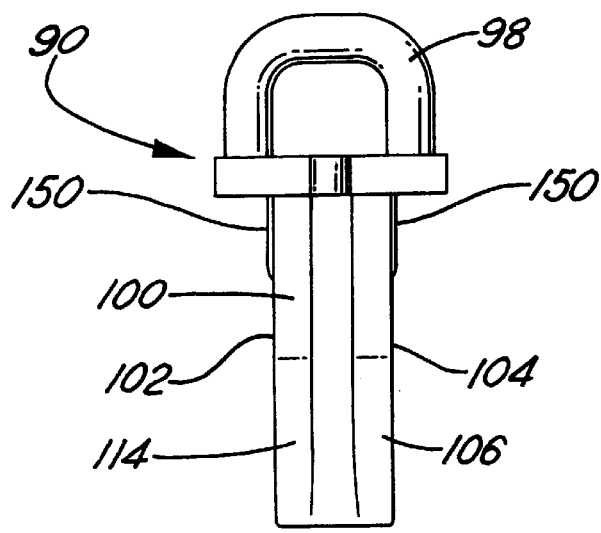
FIG. 8 is a detail view of the alignment pin looking in the direction of the arrow 8 in FIG. 4.

The outer wall 120 of the slot 94 is also serrated in an axial direction, that is from top to bottom, as seen in FIG. 7, to provide a multiplicity of closely adjacent parallel ridges 130 with grooves between the ridges, so that as the pin is inserted into the slot in wedging engagement therewith, the ridges 130 will bite into the pin with a holding action strongly resisting relative rotational movement between the pin and the slot.

The pin when inserted, passes first through the slot 92 in the outer ring plate 38 of the strut mount 32 and then into the slot 94 in the upper spring seat 66. The slot 92 has end walls 140 and 142 spaced apart a distance approximately the same as or only slightly greater than the distance between the end walls 102 and 104 of the shank 100 of the pin. The end walls of the pin fit closely between the end walls of the slot 92 (see FIG. 6). The end walls 102 and 104 also have integral shear strips 150 which extend from the handle 98 lengthwise of the shank 100. There is one such shear strip on each end wall. The shear strips have an interference fit in the slot 92. The shear strips, when the pin is inserted in the slot 92, will engage the end walls 140 and 142 of the slot 92 and the end walls will have a shearing action on the shear strips 150 to hold the pin tightly in the slot.

It is noted that the width of the shank measured from one end wall 102 to the other end wall 104 is substantially less than the corresponding or circumferential dimension of the slot 94 (see FIG. 7). This allows for minor misalignment of the strut mount 32 and the upper spring seat 66 but enables the alignment pin 90 nevertheless to secure the spring seat to the strut mount in an adjusted rotational position despite such minor misalignment.

In use, the pin 90 is removed just prior to inserting the bolts 50 into the bolt holes 53 to secure the strut mount 32, and consequently the entire spring and strut module 20, to the frame member 52.

What is claimed is:

1. Pin and slot structure for rotationally positioning a bearing and spring seat assembly relative to a strut mount of a spring and strut module of an automotive vehicle, said pin and slot structure in combination with said bearing assembly comprising, an elongated pin, said bearing and spring seat assembly including a spring seat having a first slot, said strut mount having a second slot registering with said first slot, said pin having opposite side walls which taper longitudinally toward one end thereof, one of said slots having opposed, confronting side walls which have a taper corresponding to the taper of the side walls of said pin, said pin being insertable into said slots with the tapered side walls of said pin in wedging engagement with the tapered side walls of said one slot.

2. Pin and slot structure according to claim 1, wherein the side walls of said one slot taper in a direction away from the other of said slots.

3. Pin and slot structure according to claim 1, wherein the side walls of said one slot are spaced apart radially.

4. Pin and slot structure according to claim 1, wherein said one slot has opposed, confronting circumferentially spaced end walls, and said pin has opposite end walls spaced apart a lesser distance than the end walls of said one slot.

5. Pin and slot structure according to claim 1, wherein one of the side walls of said one slot is serrated to grip the pin.

6. Pin and slot structure according to claim 1, wherein the other of said slots has circumferentially spaced apart end walls, said pin has end walls spaced apart approximately the same distance as said end walls of said other slot.

7. Pin and slot structure according to claim 6, wherein the end walls of said pin have integral shear strips engageable with the respective end walls of said other slot in an interference fit, said pin being made of a shearable material.

8. Pin and slot structure for rotationally positioning a bearing and spring seat assembly relative to an overlying strut mount of a spring and strut module of an automotive vehicle said pin and slot structure in combination with said bearing assembly, comprising an elongated pin, said bearing and spring seat assembly including an annular spring seat having a first slot, said strut mount including an annular strut mount plate having a second slot registering with said first slot, said pin having a shank provided with opposite side walls which taper longitudinally toward one end thereof, said second slot having opposed, confronting side walls which are spaced apart radially and taper in a direction away from said first slot at an angle corresponding to the angle of the taper of the side walls of said pin, said pin being insertable into said slots with the tapered side walls of said pin in wedging engagement with the tapered side walls of said second slot.

9. Pin and slot structure according to claim 8, wherein said second slot is circumferentially elongated and has opposed, confronting circumferentially spaced end walls, and said pin has opposite end walls spaced apart a lesser distance than the end walls of said second slot.

10. Pin and slot structure according to claim 9, wherein one of the side walls of said second slot is axially serrated to grip the pin.

11. Pin and slot structure according to claim 10, wherein said first slot has circumferentially spaced end walls, said pin has end walls spaced apart approximately the same distance as the end walls of said first slot, each of the end walls of said pin having an integral shear strip engageable with one of the end walls of said first slot in an interference fit, said pin being made of a shearable plastic material.

* * * * *